Nov. 10, 1953   E. H. MUDERSBACH   2,658,584
OIL CIRCULATION DEVICE
Filed Dec. 4, 1950
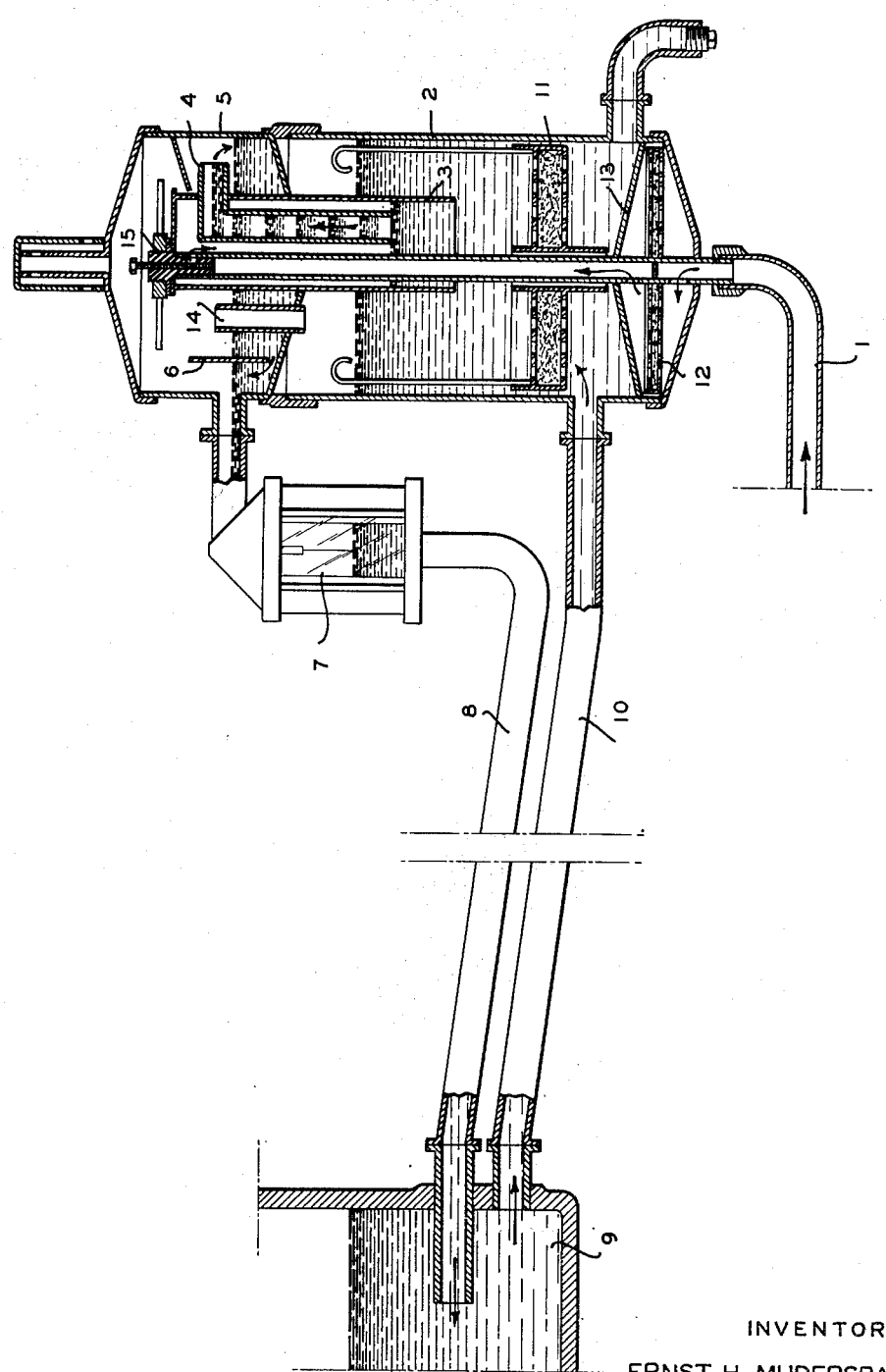
INVENTOR
ERNST H. MUDERSBACH
BY *Jurvis C. Marble*
ATTORNEY Patented Nov. 10, 1953

2,658,584

UNITED STATES PATENT OFFICE 2,658,584

OIL CIRCULATION DEVICE

Ernst H. Mudersbach, Heidelberg, Germany, assignor, by mesne assignments, to Jarvis C. Marble, New York, N. Y., Leslie M. Merrill, Westfield, N. J., and Percy H. Batten, Racine, Wis., trustees Application December 4, 1950, Serial No. 198,978

Claims priority, application Germany December 14, 1949

9 Claims. (Cl. 184—6)

Oil lubricated bearings operating with high surrounding temperatures have to be cooled by a cooling medium so that the lubricant is not unduly heated. When the bearings are located at an inaccessible place, for example, as in the case of regenerative air preheaters, it is necessary to place the oil gauge glass so far outside that it can be observed during operation. The oil level in the oil gauge glass and in the bearing are in communication by means of a pipe. This communication pipe is also exposed to the high surrounding temperature. Since the oil in this pipe is not circulating it will soon be heated. The oil is oxidized at the hot wall of the pipe, whereby the pipe will become more or less clogged. Furthermore, deposits of dust and other particles from the bearing will accumulate at the outlet of the pipe to the bearing. As soon as the pipe is completely clogged the oil level in the oil gauge glass will not indicate the oil level in the bearing. Due to the fact that the clogging cannot be observed from the outside, the oil gauge glass may, for example, still show an oil level, when in fact the bearing is already empty. This condition may result in great damage to the bearing.

It is known to circulate the oil in a closed centralized lubrication system by means of a separate driving device. This arrangement requires, however, a separate apparatus having mechanical drive. This is not required for proper lubrication when the bearing is lubricated at the beginning of rotation by means of lubricating rings or the like.

According to the present invention the oil in the bearings of regenerative air preheaters, which besides having a lubricating device in the form of lubricating rings or the like, will be continuously circulated in an open circuit. The object of the circulation is to maintain a constant flow of oil in the communication pipe to the bearing so as to avoid too high a heating of the oil. At the same time, the dust and the like which is caught by the oil in the bearing is brought outside the bearing and into a filter.

The advantage of the open circuit is that by means of these pipes the oil level in the bearing can be observed at any place outside the bearing. When the oil circulates each change of the oil level indicated in the oil gauge glass shows with accuracy the oil level in the bearing. The circulation is effected without mechanical devices and without any stop, or conveying means but by means of filtered pressure air. Such air is always available behind the fresh air fan for boilers having an air preheater. The amount of air required is extraordinarily small.

Suitable apparatus for carrying the invention into effect is shown more or less diagrammatically, partly in section and partly in elevation, in the accompanying drawing, which will now be described by way of example but without limitation, for a more detailed understanding of the nature of the invention.

The air is delivered via the circulation pipe 1 into a container 2 which is interconnected with the oil in the bearing by means of pipes 8 and 10. The air enters a pipe 3 which extends below the oil level and is open at its lower end. The delivery pipe 4 is located within the pipe 3. The air subjected to pressure above atmospheric in the supply pipe presses down the oil level in the pipe 3 to the lower opening of the pipe 4. As soon as this condition is reached, air and oil simultaneously enter into the pipe 4, the oil caught by the air flows through the side opening of the pipe 4 into the container 5. The diameter of the pipe is chosen with respect to the viscosity of the oil and is so large that the air bubbles in the oil pipe 4 will fill the whole pipe section. In this way an air bubble sometimes is set below an oil drop. Due to the low specific weight the air bubbles will lift the oil over the oil level into the container 5. After reaching a definite height the mixed column will flow to the side into the container 5. The oil will flow downwardly, while the air passes upwardly. The oil enters a chamber of the container 5 in which the air bubbles caught will be separated. From this chamber the oil flows through the lower opening of the partition 6 and enters from above into the oil gauge glass 7. This oil gauge glass is in communication with the oil in the bearing by means of the pipe 8. As long as the air bubbles are produced, the air supply for delivering a definite amount of oil is very small. Besides this the air is in contact with a small oil surface only. The oil will therefore only absorb unimportant quantities of air. If the diameter of the pipe 4 is chosen too large, small air bubbles will be produced which do not completely fill the cross-section, whereby the contact surface is increased and the air required will rise considerably.

Due to the constant circulation it is possible to observe in the oil gauge glass 7 the oil level and also the circulating quantity. From the oil gauge glass the oil flows to the bearing well or reservoir 9. The equal quantity of oil passing the oil gauge glass to the bearing flows from the bearing and via the pipe 10 to the container 2 together with the dust therein.

Before the oil enters the delivery pipe it passes through an enclosed filter 11, in which the impurities are deposited. In this way, clean oil only will enter the oil gauge glass. The upper oil chamber of the container 5, serves, furthermore, for refilling or compensating for the oil consumed.

The air at above atmospheric pressure is flowing from the fresh air fan through the air filter 12 and enters a chamber 13 before entering the circulation apparatus. The pipe part 14 is open to the atmosphere and provides for pressure equalization of the oil container 2. Desirably, the upper extremity of the pipe-like chamber 13 is provided with an adjustable valve-like closure 15.

The feeding container shown in the figure together with the devices arranged therein at the same time serves for feeding the oil, as an oil filter, as a control of the oil level, as a refilling container for oil to the bearing, as an oil supply and as an air filter. If two main bearings are located at the same level, as the case is, for example, in certain kinds of rotary air preheaters, both bearings will be interconnected through the same circulating apparatus but have separate observation glasses. Upon oil losses in one bearing this will result in that in addition to the contents of the feeding container the contents of the other bearing will also act as a reserve.

I claim:

1. The combination with a bearing lubricant well providing a reservoir lubricating a bearing at atmospheric pressure, of a system for circulating oil from and to said well comprising a vessel providing a main chamber for a reserve supply of oil at the same level as that of the oil in said well, a first conduit connecting said chamber with the lower portion of said well, a second chamber located at a level above said main chamber, means forming an air lift pump for transferring oil from said main chamber to said second chamber, said chambers being in pressure equalized communication with the atmosphere, and a second conduit for returning oil by gravity from said second chamber to said well.

2. Apparatus as defined in claim 1 in which said second conduit includes a sight glass for showing the level of the oil in said well.

3. Apparatus as defined in claim 1 including an oil filter located in the line of oil flow between said well and the inlet of said pump.

4. Apparatus as defined in claim 1 in which an air filter is located ahead of the inlet of said pump.

5. Apparatus as defined in claim 1 in which said air lift pump comprises an open lift tube extending upwardly from said main chamber into said second chamber.

6. Apparatus as defined in claim 5 in which the diameter of the lift tube is related to the viscosity of the liquid to be lifted so that air bubbles filling the entire cross section of the tube are formed to lift the liquid.

7. Apparatus as defined in claim 6 in which the diameter of the lift tube is of the order of eight to thirty millimeters for lifting lubricating oil.

8. Apparatus as defined in claim 5 in which said lift tube is surrounded by a pipe having an open end located at a level below the lower end of the lift tube and closed at its upper end, and means for delivering a regulated supply of lifting air to the upper portion of said pipe.

9. Apparatus as defined in claim 1 in which said lift tube opens into a first portion of said second chamber and baffle means is provided between said first portion of the chamber and a second portion thereof communicating with the inlet end of said second conduit, whereby to provide for deaeration of the oil delivered by said lift pump before the oil flows from the chamber.

ERNST H. MUDERSBACH.

References Cited in the file of this patent

UNITED STATES PATENTS

| Number | Name | Date |
|---|---|---|
| 1,154,745 | Brown | Sept. 28, 1915 |
| 1,410,228 | Stuck | Mar. 21, 1922 |
| 2,303,261 | Dunmire | Nov. 24, 1942 |
| 2,322,463 | McDonald | June 22, 1943 |